Dec. 17, 1968     L. S. LITTLE     3,417,228
OVERLOAD CONTROL FOR ELECTRIC HEATER ELEMENTS
Filed Nov. 17, 1966
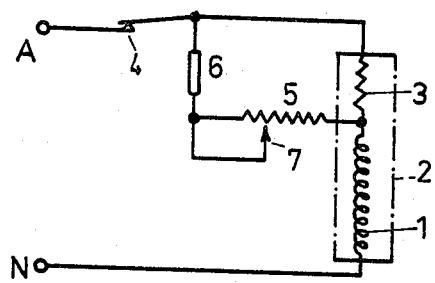
FIG. 1.
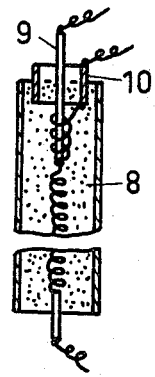
FIG. 2.
FIG. 3.
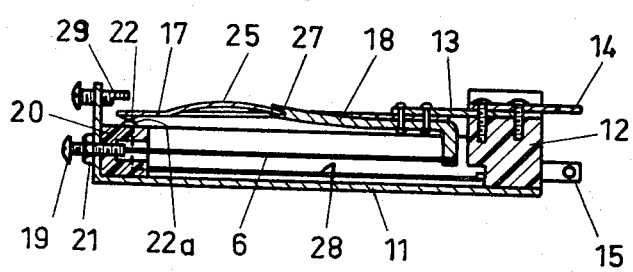
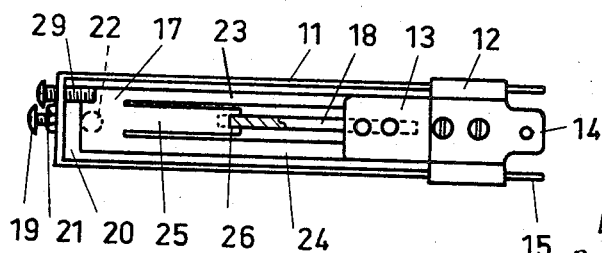
FIG. 4.
INVENTOR
LINDSAY SYDNEY LITTLE
By Millman and Jacobs
ATTORNEYS

United States Patent Office 3,417,228
Patented Dec. 17, 1968

3,417,228
OVERLOAD CONTROL FOR ELECTRIC
HEATER ELEMENTS
Lindsay Sydney Little, 34 Ewan St., Mascot,
New South Wales, Australia
Filed Nov. 17, 1966, Ser. No. 595,075
Claims priority, application Australia, Nov. 23, 1965,
66,909/65
5 Claims. (Cl. 219—504)

The invention relates to an overload control for electric heater elements and in particular to the control of heater elements enclosed in a tubular sheath.

In washing machines and other electrical appliances heater elements are used in which an electric wire or spiral is completely enclosed in a tubular sheath to prevent any direct contact between the heating wire and the surrounding medium, for example water. Although thermostatic controls have been employed in the past to prevent damage to the heater elements, these controls were operating on predetermined current values and thus did not protect the elements against damage caused by a change of the heat absorbing properties or heat conductivity of the surrounding medium. Thus, for example, the known arrangements do not protect a heater element, which is designed for operation when submerged in water, when the water is drained off and the element is surrounded by air. Attempts have also been made to provide an overload control by fixing a bimetal contact to the sheath of the heater element, but the time delay in heating up the bimetal sufficiently for operation will not prevent damage to the element.

Furthermore this latter arrangement can lead to unnecessary interruptions of the heater circuit if the heater element is, for example, used for heating hard water. Under these conditions for example, calcium will deposit as a layer around the heater element and the bi-metal contact which is normally enclosed in a copper pocket soldered to the sheath of the element. As the calcium is a rather poor heat conductor, while copper is a good heat conductor, the bi-metal contact will be heated up to its cut-off temperature when the overall temperature of the heater element has not yet reached the danger point, and thus the circuit for the heater element will be cut-off unnecessarily.

To overcome the above mentioned disadvantages the invention provides an overload control for electric heater circuits including a heater element enclosed in a tubular element which is characterised by a heat-variable resistor enclosed in tubular sheath together with the heater element and electrically connected in series therewith, a further resistor substantially immune to temperature changes electrically connected parallel to said heat-variable resistor and a contact device connected to said further resistor and sensible to changes in current flow through said further resistor to interrupt the operating circuit of said heater element, when the temperature within said sheath exceeds a predetermined limit.

Thus the overload control is directly dependent on the heat developed by the heater element within the sheath and is independent of changes in the heat conductivity surrounding the sheath as long as the heat in the sheath remains within the limits permitted for safe operation of the heater element.

In order to provide for adjustment of the overload control to a particular temperature in the sheath at which the circuit of the heater element should be interrupted it is advantageous to arrange the further substantially temperature-immune resistor outside the sheath at a suitable easily accessible position and to make this resistor adjustable, so that the current flow through the resistor can be altered, thus altering the operating conditions of the contact device responding to said current.

The invention will be described hereinafter in more detail in connection with one embodiment of the invention as shown in the drawings in which:

FIG. 1 shows the electric circuit of an electric heater element and the overload control of the invention.

FIG. 2 is a cross-section of a heater element incorporating the heat-variable resistor according to the invention.

FIGS. 3 and 4 are a side view in section and a plan view respectively of a contact device suitable for operation with the circuit of FIG. 1.

Referring to FIG. 1 a heater element 1 is enclosed in a tubular sheath 2 which also contains a heat-variable resistor 3 connected in series with the element 1. The free end of the element 1 is connected to the terminal N of a suitable power source while the free end of the heat-variable resistor 3 is connected over a normally closed contact 4 with the terminal A of the power source.

Connected in parallel to the heat-variable resistor 3 is a variable substantially temperature-immune resistor 5 in series with a resistance wire 6, which lengthens under heat produced by the current flowing therethrough and operates the contact 4 as will be explained hereinafter.

When the power is switched on, current flows through the heater element 1 and the heat-variable resistor 3, so that the latter attains the same temperature as the heater element in the sheath 2. In addition current will also flow through the resistance wire 6 and the resistor 5 which for convenience is arranged outside the sheath 2 at an easily accessible position. The current through the wire 6 and resistor 5 will depend on the setting of the wiper 7 as well as the resistance of the heat-variable resistor 3. Thus if the latter is heated its resistance will increase and will thereby increase the current flow through wire 6 and resistor 5. At a predetermined current value the wire 6 will operate the contact 4 as described later on and interrupt the circuit for the heater element 1. The interruption of the circuit at contact 4 is therefore dependent on the heat developed within the sheath and thus the heater element 1 will be protected under all conditions against overheating with resultant damage to the heater element.

After the power has been switched off the heater element as well as the heat-variable resistor cool off and according to the type and the setting of the control device the latter closes again to start the next heating cycle or keeps the power supply disconnected until the control device is re-set manually.

The heat-variable resistor 3 can for example be made of nickel with a resistance of 0.2 ohms under room temperature while the outside resistor 5 has a value of about 5 ohms and can be varied slightly by the wiper 7, but is independent of temperature changes.

FIG. 2 shows the arrangement of the heater element 1 and the heat-variable resistor 3 in the sheath 1. The sheath is filled with a suitable insulating material, for example magnesium or zirconium oxide 8 and the heat-variable resistor 3 is arranged around the lead 9 leading from the junction point of element 1 and resistor 3 to the outside of the sheath 1. The electric connection to the free end of resistor 3 can take the form of metallic ring or tube 10 which is partly embedded in the insulation material.

A contact device which is suitable for operating the contact 4 by means of the hot wire 6 is shown in FIGS. 3 and 4.

The device consists of a half-tubular metallic support 11 which is closed at one end by a block 12 of insulating material, supporting a flat biassing spring 13 and terminals 14, 15 and 16.

The spring 13 carries a contact spring 17 connected with terminal 14 as well as an L-shaped bracket 18 which has a short leg connected with one end of the resistance wire 6, the other end of the wire being connected to an adjustable screw 19 electrically connected to support 11 and terminal 16 and passing through an insulating block 20 at the other end of the support 11. By turning the nut 21 on screw 19 the tension on wire 6 and thus on bracket 18 and spring 13 can be varied. The material for the support 11 is so chosen, that its expansion coefficient is substantially the same as that of the wire 6.

The contact spring 17 carries at its free end a contact 22 which co-operates with a fixed contact 22A mounted on block 20 and connected by a lead 28 with terminal 15.

The contact spring 17 is slotted in the longitudinal direction to form two supporting arms 23 and 24 and between them a tongue 25 which has U-shaped recess 26 at its free end. The longer leg of bracket 18 is slightly bent upwardly and has a V-shaped groove 27 which accepts the recess 26 of tongue 25. The length of the tongue 25 is such that the tongue is bent out of the plane of the contact spring 17 when its end engages the groove 27.

The wire 6 is normally tightened to such an extent that the groove 27 and the tongue 25 are slightly above the plane of the contact spring 17 and thus the tension of the tongue 25 will press the legs 23 and 24 and contact 22 downwards against the fixed contact 22A.

When the wire 6 is heated and thus is lengthened the bracket 18 under bias from spring 13 can move its longer leg to a position where the groove 27 is below the plane of the contact spring 17. Thus tongue 25 will flex to a position opposite to its previous position and consequently will force the legs 23 and 24 upwards to open the contacts 22 and 22A under snap action. The upward movement of contact spring 17 is limited by an adjustable stop 29, which may consist of a screw having a flattened end. Depending on the initial tension of the resistance wire 6 and the adjustment of the stop 29 the contact spring 17 will automatically close the contacts again when the wire cools off or the contact spring has to be re-set manually. In the latter type of operation the circuit remains interrupted until any fault which may have developed in the apparatus incorporating the heater element has been rectified.

By suitable adjustment of the adjustable resistor it is possible to control the heater element in any type of heating device either for domestic or industrial use. For example a bank of heaters in an air-conditioning duct can be protected against failure by checking the temperature rise in one of the elements and interrupting the circuit of all elements if the rise in the one element exceeds the predetermined limit.

Th arrangement can be used also as a temperature controlled relay to bring other electrical circuits into operation when certain temperature conditions are present.

As the control arrangement is responsive to the internal temperature of the heat-variable resistor within the sheath, conditioned by the heat conductivity of the surrounding medium and adjustable by the external resistor, switching cycles can be promoted at predetermined temperatures of the heated medium by adjusting the resistor to various values. Thus, for example, in semi-automatic domestic washing machines, where a thermostat promotes a washing cycle at a predetermined water temperature, adjustment of the adjustable resistor can be used to operate the contact device at a predetermined temperature and at the same time to close a circuit for a wash cycle motor.

The wiper of the adjustable resistor can, for example, be used to reset the contact spring by means of a cam, so that when the wiper is set to zero the cam closes the contacts, which then remain closed while the wiper is set to the required temperature cut-off point.

It must be understood furthermore that the above described contact device is only one form of contact breaker, depending on the current flow in the adjustable resistor and other forms of current-sensitive device can be used without departing from the scope of the invention.

I claim:

1. Overload control for electric heaters circuits including a heater element enclosed in a tubular sheath characterised by a heat-variable resistor enclosed in said tubular sheath together with said heater element and electrically connected in series therewith, a further resistor substantially immune to temperature changes electrically connected parallel to said heat-variable resistor and a contact device connected to said further resistor and sensible to changes in current flow through said further resistor to interrupt the operating circuit of said heater element, when the temperature within said sheath exceeds a predetermined limit.

2. Overload control according to claim 1 in which the further resistor is mounted outside of and spaced from the tubular sheath of the heater element.

3. Overload control according to claim 2 in which the further resistor is adjustable in its resistance value.

4. Overload control according to claim 1 in which said contact device includes a support, a movable contact and a fixed contact mounted on opposite ends of said support and co-operating with each other and being interposed in the operating circuit of the heater element, said movable contact having spring means fixed to one end of said support to bias said contact to a circuit open position, and a resistance wire stretched between said spring means and the other end of said support to normally hold the movable contact in a circuit-closed position, said wire being electrically connected in series with said further resistor and being lengthened by current flow therethrough to permit the moving contact to change from the circuit-close to the circuit-open position, when the current therethrough reaches a predetermined value.

5. Overload control according to Claim 4 in which a flat spring supports the movable contact, said spring having a tongue formed thereon to bias said contact in two positions on opposite sides of the plane of the spring, said tongue providing a snap-action for movement of said contact from one position to the other.

References Cited

UNITED STATES PATENTS 2,777,932  1/1967  Barr et al _____ 219—505

FOREIGN PATENTS 682,217  3/1964  Canada.

BERNARD E. GILHEANY, *Primary Examiner.*

F. E. BELL, *Assistant Examiner.*

U.S. Cl. X.R.

219—505